United States Patent Office 2,913,500
Patented Nov. 17, 1959

---

2,913,500

PRODUCTION OF OCTACHLOR-DIPROPYL ETHER

Friedrich Becke, Heidelberg, and Heinrich Sperber, Ludwigshafen (Rhine), Germany, assignors to Badische Anilin- & Soda-Fabrik Aktiengesellschaft, Ludwigshafen am Rhine, Germany No Drawing. Application November 13, 1957
Serial No. 696,023

Claims priority, application Germany November 17, 1956

2 Claims. (Cl. 260—614)

This invention relates to a process for the production of octachlor-dipropyl ether. Especially this invention relates to a process for producing octachlor-dipropyl ether by reacting trichlorethylene with paraformaldehyde.

It is already known to prepare octachlor-dipropyl ether by adding on trichlorethylene to dichlor-dimethyl ether in the presence of halides of polyvalent metals of the type of Friedel-Crafts catalysts. Prins (Recueil des Travaux Chemiques des Pay-Bas, vol. 72 (1953), pages 867–877) has reacted trichlorethylene with paraformaldehyde in the presence of aluminium chloride. He has not been successful however in isolating octachlor-dipropyl ether from the reaction mixture of the various chlorine-containing ethers, alcohols and acid chlorides formed.

We have now found that octachlor-dipropyl ether is obtained pure and in good yields by reacting trichlorethylene with paraformaldehyde in the presence of aluminium chloride in an organic solvent or diluent.

The reaction is carried out in the temperature range between the freezing point of the solvent or diluent used and +60° C., advantageously at 10° to 45° C.

To each mol of formaldehyde in the form of paraformaldehyde there are suitably used 1 to 2 mols of trichlorethylene and ⅓ to 1 mol of aluminium chloride; it is advantageous to react 1 mol of formaldehyde in the form of paraformaldehyde with 1 mol of trichlorethylene and ⅔ mol of aluminium chloride.

Suitable solvents or diluents are for example aliphatic and cycloaliphatic hydrocarbons, such as petroleum ether or cyclohexane. Other solvents which do not enter into side reactions under the reaction conditions, as for example carbon disulfide or nitrobenzene can also be used. It is advantageous to use saturated halogen hydrocarbons, as for example chloroform or carbon tetrachloride; methylene chloride is especially suitable.

The reaction is preferably carried out by introducing two components into the solvent, for example trichlorethylene and aluminium chloride or paraformaldehyde and aluminium chloride, and then adding the third component in such a way that the heat of reaction set free can be led away, if necessary by cooling. In the case of large batches, the aluminium chloride is added in portions. In general the reaction proceeds to completion in five hours even in the case of large batches. With smaller batches, the reaction period may be from 1 to 2 hours.

A preferred manner of carrying out the reaction consists in allowing the initial materials in appropriate proportions to flow through a reaction tube, which is kept at a suitable temperature, at such a speed that the reaction product can be withdrawn continuously at the other end.

For working up, the reaction product is introduced into water or a mixture of ice and water for the decomposition of the aluminium chloride and the organic layer separated, washed with water, if necessary dried and distilled. The octachlor-dipropyl ether may be separated without trouble by distillation from the byproducts of the reaction. In general the octachlor-dipropyl ether is obtained in a yield of 60 to 70% of the theoretical yield in the form of an oily water-white to pale yellowish liquid of the boiling point 144° to 150° C. at 1 mm. Hg.

Operation in accordance with this invention renders it possible to prepare octachlor-diproyl ether directly from paraformaldehyde in a single reaction stage.

Octachlor-dipropyl ether has good insecticidal and synergistic action with only slight toxicity. It may therefore be conveniently used in admixture with pyrethrins as a household insecticide. Moreover it may also find use as a solvent and as an intermediate product.

The following example will further illustrate this invention but the invention is not restricted to this example. The parts specified in the example are parts by weight.

*Example*

1,260 parts of trichlorethylene and 800 parts of aluminium chloride in all are added alternately in batches each of one tenth of the total amount during the course of an hour while cooling to 300 parts of paraformaldehyde (96%) and 80 parts of anhydrous aluminium chloride which are suspended in 1,000 parts of methylene chloride. The whole is then stirred for half an hour at 30° to 35° C. In order to decompose the aluminium chloride, the reaction mixture is poured onto ice and the lower organic layer which settles out is separated, washed twice with water and dried with calcium chloride. By distillation there are obtained, after a first running which contains the solvent and unreacted trichlorethylene, 1,160 parts of octachlor-dipropyl ether of the boiling point 144° to 155° C. at 1 mm. Hg $$(n_D^{20}=1.5282)$$

corresponding to a yield of 64% of the theoretical yield with reference to the paraformaldehyde used and also with reference to trichlorethylene.

We claim:

1. A process for the production of octachlor-dipropyl ether which comprises reacting, in relative proportions, 1 mol of formaldehyde in the form of paraformaldehyde with 1 to 2 mols of trichlorethylene in the presence of ⅓ to 1 mol of aluminium chloride in methylene chloride solvent at a temperature in the range of 10° C. to 45° C.

2. A process as claimed in claim 1 wherein, in relative proportions, 1 mol of formaldehyde in the form of paraformaldehyde, 1 mol of trichlorethylene and ⅔ mol of aluminium chloride are used.

References Cited in the file of this patent

Prins: Recueil des Travaux Chemiques des Pay-Bas, vol. 72, (1953), pages 867–877.